United States Patent
Natori et al.

(10) Patent No.: US 7,140,001 B1
(45) Date of Patent: Nov. 21, 2006

(54) METHOD FOR CONSTRUCTING BUSINESS APPLICATION SYSTEM AND COMPUTER-READABLE STORAGE MEDIUM HAVING STORED FRAMEWORK FOR BUSINESS APPLICATION SYSTEM

(75) Inventors: Mari Natori, Kawasaki (JP); Hiroshi Okano, Urawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/262,743

(22) Filed: Mar. 5, 1999

(30) Foreign Application Priority Data

Jul. 24, 1998 (JP) .................................. 10-209724

(51) Int. Cl.
G06F 9/44 (2006.01)

(52) U.S. Cl. ....................... 717/105; 717/107; 717/109; 717/113

(58) Field of Classification Search ................ 395/711, 395/702; 717/1, 2, 11, 100–123, 140, 709; 705/24

See application file for complete search history.

(56) References Cited

U.S. PATENT DOCUMENTS

| | | | |
|---|---|---|---|
| 5,987,247 A * | 11/1999 | Lau | 395/702 |
| 5,987,423 A * | 11/1999 | Arnold et al. | 717/102 |
| 6,070,152 A * | 5/2000 | Carey et al. | 705/35 |
| 6,106,569 A * | 8/2000 | Bohrer et al. | 717/1 |
| 6,134,706 A * | 10/2000 | Carey et al. | 707/1 |
| 6,249,905 B1 | 6/2001 | Yoshida et al. | |
| 6,253,282 B1 * | 6/2001 | Gish | 711/113 |
| 6,430,740 B1 * | 8/2002 | Hart et al. | 717/108 |

OTHER PUBLICATIONS

James Martin, Principles of Object Oriented Analysis and Design, © 1993, p. 60, 61, 103-107, 118, 119, 232, 244, 265, 266.*
Rober Orfali, Client/Server Programming With Java and Corba, Published 1996, p. 138, 139.*
The San Francisco Project, An Object-Oriented Framework Approach to Building Business Applications, pp. 416-424.*
Paul Dustin Keefer, "An Object Oriented Framework for Accounting Systems", Published 1994. p. 1-86.*
M. Natori et al., "A Framework for Contructing Business Application Software," Oct. 18, 1998, Pre-Addendum OOPSLA'98, p. 36-37.

(Continued)

Primary Examiner—Tuan Dam
Assistant Examiner—Chuck Kendall
(74) Attorney, Agent, or Firm—Finnegan, Henderson, Farabow, Garrett & Dunner, L.L.P.

(57) ABSTRACT

A framework for a business application system, which is used for constructing the business application system, is described by an object-oriented language having characteristics of abstraction and inheritance. The framework includes an abstract class group 10 having abstractly defined the structure and behavior of the business application system, and a common component group 20 including a plurality of common components commonly for use in the business application system. The abstract class group 10 includes a system core class group 11 having abstractly defined the basic structure and behavior of the business application system, and a screen system class group 12, a report system class group 13 and a business logic system class group 14, which inherit the system core class group 11. Thus, it is possible to provide a method for constructing a business application system, which can commonly use and reuse the basic structure of the overall business application system and which can flexibly and easily change and extend the business application system in accordance with a specification change.

14 Claims, 14 Drawing Sheets

OTHER PUBLICATIONS

IBM San Francisco Frameworks, <http://www.developer.ibm.com:8080/welcom/java/sftcovr.html>, 1997.

Notification of Reason for Rejection issued by the Japanese Patent Office, mailed Feb. 24, 2006, for Japanese Patent Application No. 053231/1999, and English-language translation thereof.

Eguchi et al., "Spiral Approach for Constructing Reused Class Library," Information Processing Society of Japan (Sep. 22, 1995), pp. 5-133-134.

Pree, "Design Patterns for Object-Oriented Software Development," Toppan Ltd. (May 30, 1996), pp. 1-300.

Tusda et al., "Developing components from business specifications," Information Processing Society of Japan (Jan. 22, 1998), pp. 51-52, Abstract.

Ooi et al., "Soludina™ Sales Management System for Business Solutions," Toshiba Review (Apr. 1, 1998), 53:63-67, Abstract.

* cited by examiner

METHOD FOR CONSTRUCTING BUSINESS APPLICATION SYSTEM AND COMPUTER-READABLE STORAGE MEDIUM HAVING STORED FRAMEWORK FOR BUSINESS APPLICATION SYSTEM

BACKGROUND OF THE INVENTION

1. Field of the Invention

The present invention relates generally to a method for constructing a business application system. More specifically, the invention relates to a method for constructing a business application system using a framework described by an object-oriented language, and a computer-readable storage medium having stored a framework for a business application system.

2. Related Background Art

Typical business application systems execute batch processing, such as a registration management for data to a database, a report output based on registered data, and business calculation. Such systems are typically utilized for various affairs, such as personnel management and inventory management. Such affairs for business application systems include many affairs, such as in-home care affairs, wherein specifications must be periodically changed by the amendments of laws and/or systems. In this case, it is desired that the business application system can be flexibly and easily changed and extended in accordance with the specification change. In addition, when the business application system is provided as a package, it is required to customize the provided business application system in accordance with a user's request. Also in this case, it is desired that the business application system can be flexibly and easily changed and extended.

By the way, when such a business application system, particularly a medium or large scale business application system, is designed and packaged, the business application system is often conventionally divided every independent functions to be developed to take charge of part of the work. As a general purpose development tool for such a business application system, the San Francisco Frameworks proposed by IBM Corporation are known. The San Francisco Frameworks provide application logic for executing calculation processing, statistical processing and so forth which are peculiar to the business application, the packaging environment thereof and so forth, as reusable components. If such components are suitably combined, the business application system can be efficiently constructed.

As described above, the business application system is often conventionally divided every independent functions to be developed to take charge of part of the work. However, in such a conventional development method, even the basic structure of the business application system, which is commonly for use in the respective functions, is separately developed for each function. Therefore, the business application system includes the basic structure thereof and the part easily influenced by the specification change, so that it is difficult to change and extend the business application system in accordance with the specification change.

In addition, even if the above described San Francisco Frameworks are used as general purpose development tools, it is not enough to easily change and extend the overall business application system. That is, although the business application system is usually constructed by combining the respective functions of a screen system, a report system and a business logic system, the San Francisco Frameworks mainly provide only the components of the business logic system, so that it is difficult to change and extend the basic structures relating to the screen system and the report system other than the business logic system. In addition, for the same reasons, it is not possible to commonly use and reuse the basic structures of the overall business application system including the screen system, the report system and the business logic system.

Furthermore, when such San Francisco Frameworks are used to develop the business application system, the functional groups, such as the screen system and the report system, are developed every functional group. In this case, it is required to take into account of the adjustment for processing wherein a certain functional group has an influence on other functional groups.

Specifically, for example, when the business application system is developed by different developers every functional group, the developer for a report system may design the report system so as to execute exclusive processing which does not allow the registration of data from a screen system when a report is printed, and the developer for the screen system may design the screen system so that a user management information is displayed even if the report is printed. In this case, the overall business application system lacks consistency, so that it is required to modify one of the designs of the report system and the screen system so as to be adapted to the other design. For that reason, each of developers must develop the system while cooperating with the other developers.

SUMMARY OF THE INVENTION

It is therefore an object of the present invention to eliminate the aforementioned problems and to provide a method for constructing a business application system, which can flexibly and easily change and extend the business application system in accordance with a specification change and which can commonly use and reuse a basic structure for the overall business application system, and a computer-readable storage medium, in which a framework for the business application system has been stored.

In order to accomplish the aforementioned and other objects, according to one aspect of the present invention, there is provided a method for constructing a business application system by using a framework described by an object-oriented language, the method comprising the steps of: preparing a system core class group, which has abstractly defined a basic structure and behavior of a business application system, and an abstract class group, which inherits the system core class group and which includes a screen system class group, a report system class group and a business logic system class group; inheriting the screen system class group, the report system class group and the business logic system class group of the abstract class group to prepare a screen system functional group, a report system functional group and a business logic system functional group; inheriting the system core class group of the abstract class group to prepare a system core functional group; and integrating the screen system functional group, the report system functional group, the business logic system functional group and the system core functional group. In this method, the preparing step may prepare, as the abstract class group, an abstract class group which further includes a common component group including a plurality of common components commonly for use in the business application system, each of the common components having an interface with the abstract class group.

According to another aspect of the present invention, there is provided a computer-readable storage medium having stored a framework for a business application system, which has been described by an object-oriented language, the framework including: an abstract class group which has abstractly defined a structure and behavior of a business application system, the abstract class group including a system core class group, which has abstractly defined a basic structure and behavior of the business application system, and a screen system class group, a report system class group and a business logic system class group, which inherit the system core class group. This storage medium may further include a common component group including a plurality of common components commonly for use in the business application system, each of the common components having an interface with the abstract class group.

According to a further aspect of the present invention, there is provided a computer-readable storage medium having stored a framework for a business application system, which includes a plurality of class groups which are described by an object-oriented language and which are capable of manipulating data uniformly produced from each of the class groups, the framework including: a system core class group having defined the manipulation of data; and a plurality of subclasses inheriting the system core class group. In this case, the system core class group may have defined the calling of a common component commonly for use in the business application system.

According to a still further aspect of the present invention, there is provided a computer-readable storage medium having stored a framework for a business application system, which includes a plurality of class groups which are described by an object-oriented language and which are capable of transmitting and receiving a request between functions produced from each of the class groups, the framework including: a system core class group having defined the transmission and receiving of a request between functions; and a plurality of subclasses inheriting the system core class group. In this case, the system core class group may have defined the calling of a common component commonly for use in the business application system.

According to the present invention, a system core class group, which has abstractly defined the basic structure and behavior of a business application system by an object-oriented language having characteristics of abstraction and inheritance, and an abstract class group including a screen system class group, a report system class group and a business logic system class group, which inherit the system core class group, are prepared to inherit the system core class group, the screen system class group, the report system class group and the business logic system class group of the abstract class group to construct the business application system, so that the basic structure of the overall business application system, such as the screen system, the report system and the business logic system, can be clearly separated from a part which is easily influenced by a specification change. Therefore, the part of the business application system to be changed and modified can be easily identified as the attribute and method of the abstract class, and the part can be changed and modified by the inheritance of the identified abstract class, the implementation of the method and so forth. Thus, even if it is required to change the specification of the business application system due to the amendments of laws and/or systems, it is possible to flexibly and easily change and extend the business application system.

In addition, according to the present invention, the basic structure of the overall business application system, such as the screen system, the report system and the business logic system, is prepared as the abstract class group, so that the basic structure of the overall business application system can be commonly used and reused. Therefore, the reusable range can be extended in comparison with those in conventional development methods, by commonly used and reused calculation components and GUI components, so that the productivity in the development of the business application system can be remarkably improved.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

Referring now to the accompanying drawings, the preferred embodiments of the present invention will be described below.

Figure 1:
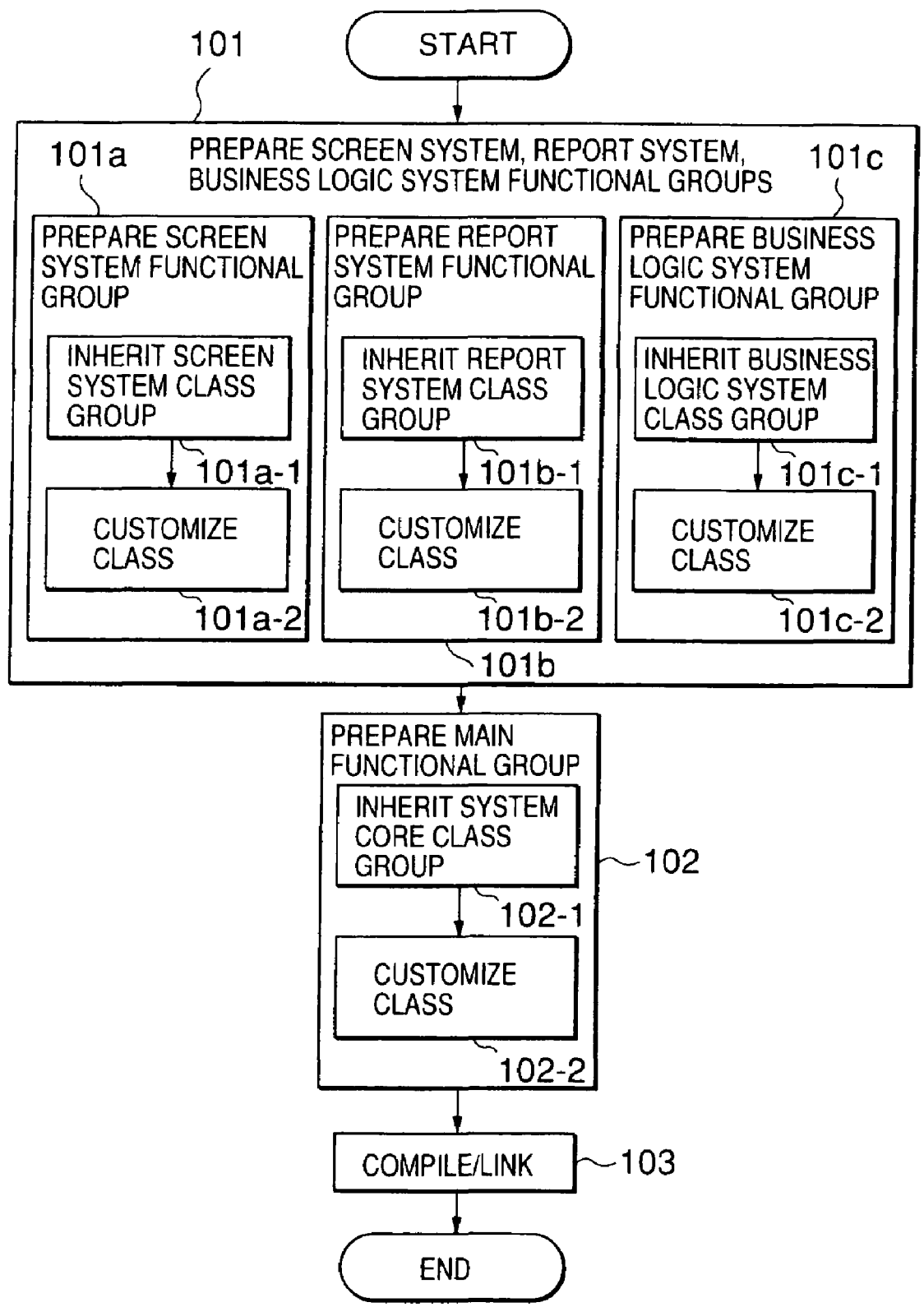
FIG. 1 is a flow chart for explaining a preferred embodiment of a method for constructing a business application system according to the present invention.
Figure 2:
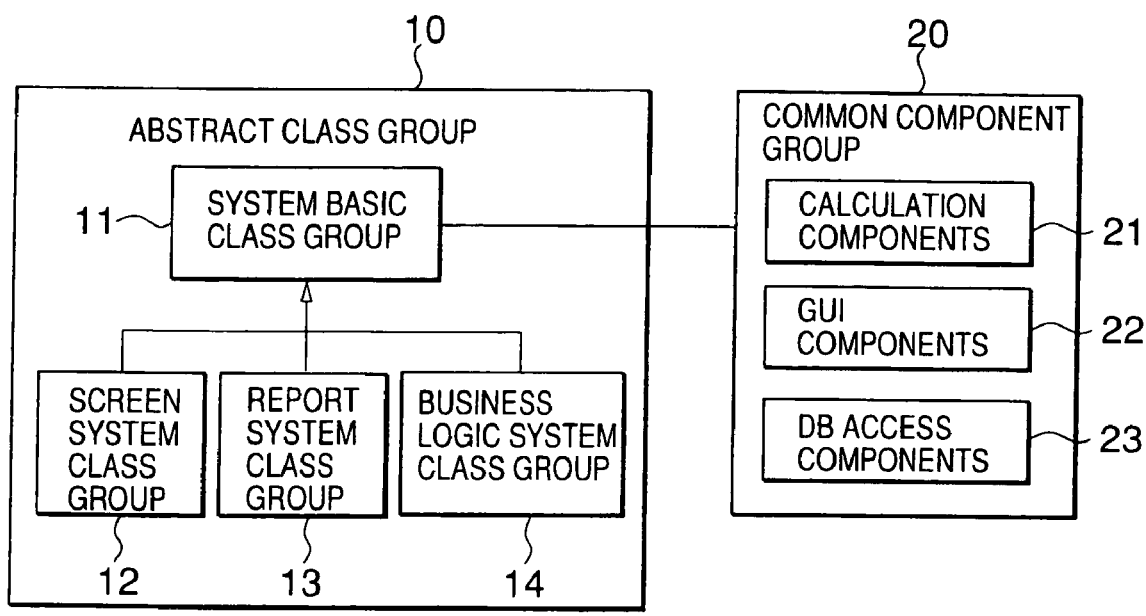
FIG. 2 is a schematic diagram of a framework for a business application system for use in the constructing method shown in FIG. 1.

FIGS. 1 and 2 are diagrams for explaining a preferred embodiment of a method for constructing a business application system according to the present invention.

First, referring to FIG. 2, a framework for a business application system for use in a method for constructing the business application system in this preferred embodiment will be described. Furthermore, it is assumed that the framework for the business application system is described by an object-oriented language having characteristics of "abstraction" and "inheritance". Throughout the specification, the term "abstraction" means that a common property of a plurality of objects is generalized to be defined as a class, and the term "inheritance" means that a lower class inherits all of the definitions (attributes and methods) of an upper class.

As shown in FIG. 2, the framework for the business application system includes an abstract class group 10 which has abstractly defined the structure and behavior of the business application system, and a common component group 20 including a plurality of common components commonly for use in the business application system.

The abstract class group 10 includes a system core class group 11 which has abstractly defined the basic structure and behavior of the business application system, a screen system class group 12 which is a subclass group inheriting the system core class group 11, a report system class group 13, and a business logic system class group 14. The system core class group 11 is a set of abstract classes for providing the start and termination of processing, the manipulation of data, the transmission and receiving of a request, the selection of a menu, the transition of processing, the control of a screen system, a report system and a business logic system, the input/output of data, the interface (the calling of components) to the common component group 20, and so forth. The screen system class group 12 is a set of abstract classes for defining the common attribute and behavior on all of screens for use in the business application system, the layout of the screens, the inherent attribute and behavior of a specific screen, and so forth. The report system class group 13 is a set of abstract classes for defining the common attribute and behavior on report prints. The business logic system class group 14 is a set of abstract classes for defining the common attribute and behavior in business calculations.

Furthermore, each of abstract classes included in each of the system core class group 11, the screen system class group 12, the report system class group 13 and the business logic system class group 14 of the abstract class group 10 preferably includes an abstract method and a concrete method.

The common component group 20 is a set of common components called from the system core class group 11 of the abstract class group 10. The common component group 20 includes calculation components 21, graphical user interface (GUI) components 22, and database (DB) access components 23. The calculation components 21 is a set of components for handling calculations for age, time and so forth. The GUI components 22 is a set of components for handling graphics on screens for inputting date, conditions and so forth. The DB access components 23 is a set of components for handling operations, such as access to a database.

Referring to FIGS. 1 and 2, a method for constructing a business application system using such a framework for the business application system will be described below. FIG. 1 is a flow chart of a preferred embodiment of a method for constructing a business application system according to the present invention. This method will be described assuming that the framework for the business application system shown in FIG. 2 has been prepared.

First, the screen system class group 12, the report system class group 13 and the business logic system class group 14 of the abstract class group 10 in the framework for the business application system shown in FIG. 2 are inherited to prepare a screen system functional group, a report system functional group and a business logic system functional group (step 101).

Specifically, an optional abstract class is inherited from the screen system class group 12 (step 101a-1), and the method of the inherited abstract classes is implemented or an attribute and a method are added thereto, so that the abstract class is customized (step 101a-2) to prepare the screen system functional group. In addition, an optional abstract class is inherited from the report system class group 13 (step 101b-1), and the method of the inherited abstract class is implemented or an attribute and a method are added thereto, so that the abstract class is customized (step 101b-2) to prepare the report system functional group. Moreover, an optional abstract class is inherited from the business logic system class group 14 (step 101c-1), and the method of the inherited abstract class is implemented or an attribute and a method are added thereto, so that the abstract class is customized (step 101c-2) to prepare the business logic system functional group. The order of steps 101a, 101b and 101c is optional. The screen system functional group, the report system functional group and the business logic system functional group may be prepared in any orders.

After the screen system functional group, the report system functional group and the business logic system functional group are thus prepared, the system core class group 11 of the abstract class group 10 is inherited to prepare a main functional group (a system core functional group) (step 102).

Specifically, an optional abstract class is inherited from the system core class group 11 (step 102-1), and the method of the inherited abstract class is implemented or an attribute and a method are added thereto, so that abstract class is customized (step 102-2) to prepare a main functional group. The order of steps 101 and 102 is optional. The screen system functional group, the report system functional group and the business logic system functional group may be prepared after the main functional group is prepared.

Finally, after the main functional group is thus prepared, the screen system functional group, the report system functional group and the business logic system functional group, which have been prepared at step 102, are compiled and linked with the system core functional group prepared at step 102 (step 103). Thus, the business application system is constructed.

Thus, according to this preferred embodiment, the abstract class group 10, which includes the system core class group 11 having abstractly defined the basic structure and behavior of the business application system by the object-oriented language having the characteristics of abstraction and inheritance, the screen system class group 12 inheriting the system core class group 11, the report system class group 13 and the business logic system class group 14, is prepared. In addition, the system core class group 11, the screen system class group 12, the report system class group 13 and the business logic system class group 14 of the abstract class group 10 are inherited to construct the business application system. Thus, the basic structure of the overall business application system including the screen system, the report system and the business logic system can be clearly separated from a part which is easily influenced by the specification change. Therefore, a part of the business application system to be changed and extended can be easily identified as the attribute and method of the abstract class. In addition, the business application system can be changed and extended by the inheritance of the identified abstract class, the implementation of the method and so forth. Therefore, even if it is required to change the specification of the business application system due to the amendments of laws, systems and so forth, it is possible to flexibly and easily change and extend the business application system.

According to this preferred embodiment, since the basic structure of the overall business application system, such as the screen system, the report system and the business logic system, is prepared as the abstract class group 10, the basic structure of the overall business application system can be commonly used and reused. Therefore, the reusable range which can commonly use and reuse the processing components and the GUI components is extended in comparison with that in the conventional development method, so that it is possible to greatly improve the productivity in the development of the business application system.

Figure 3:
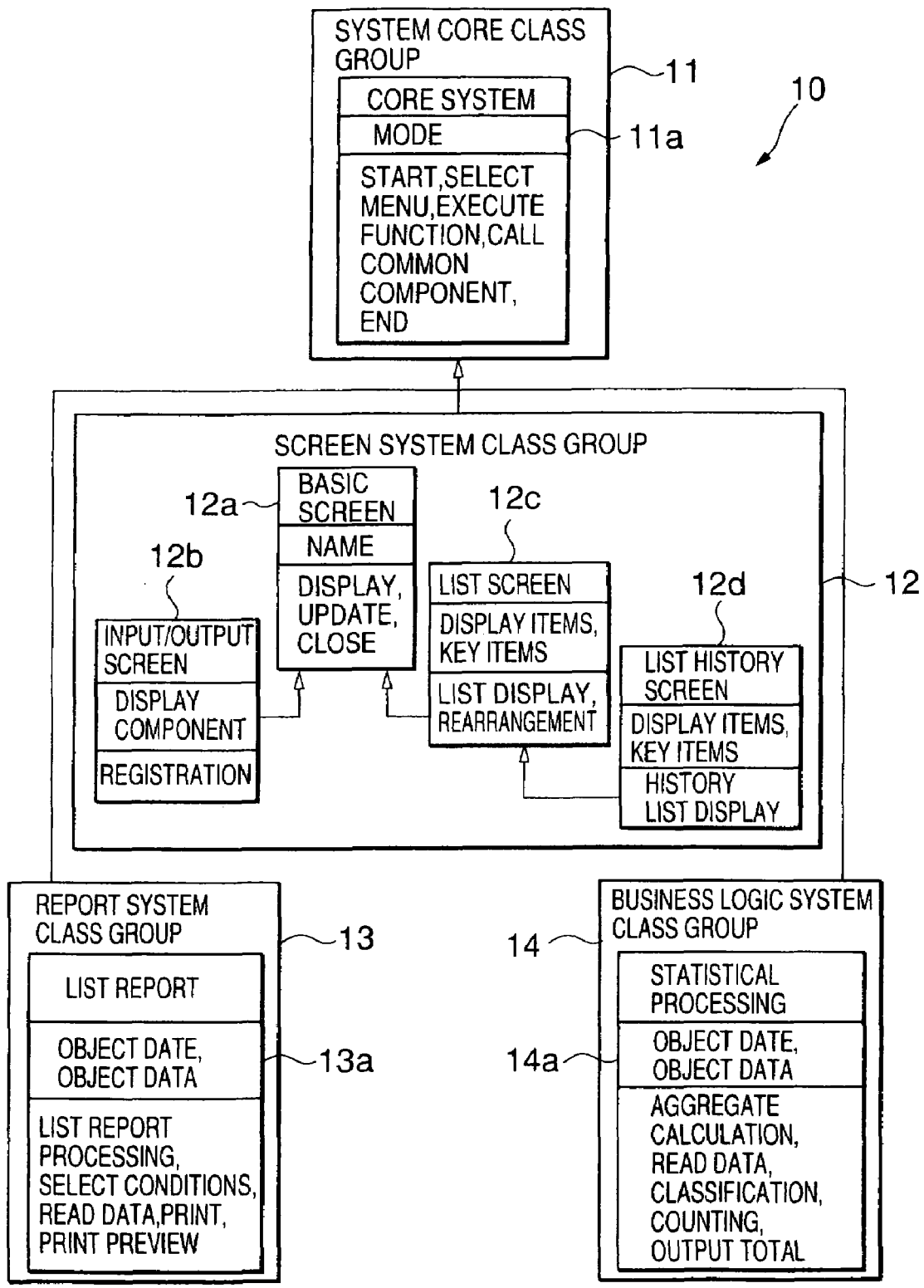
FIG. 3 is a schematic diagram of a preferred embodiment of an abstract class group of the framework for the business application system shown in FIG. 2.

Furthermore, in the above described preferred embodiment, each of the system core class group 11, the screen system class group 12, the report system class group 13 and the business logic system class group 14 preferably includes a plurality of abstract classes having a hierarchical structure based on an inheritance relationship (see the screen system class group 12 in FIG. 3). Thus, the optimum abstract class can be selected from some abstract classes having different abstraction levels, so that it is possible to efficiently construct the business application system.

Figure 11:
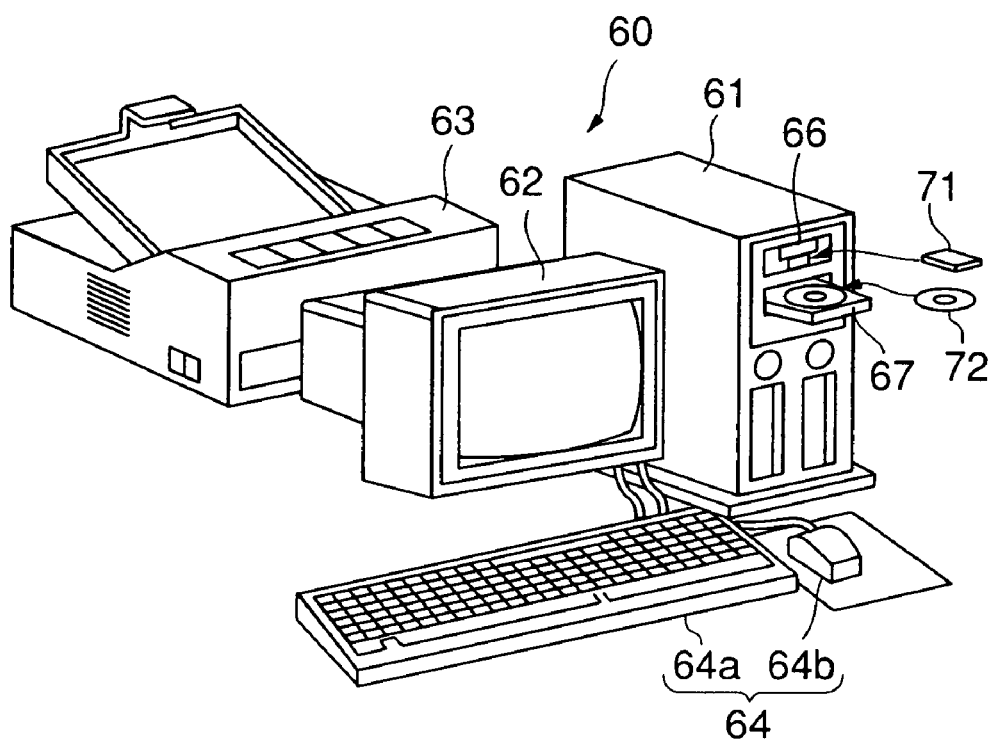
FIG. 11 is a perspective view of the appearance of a computer system which uses a method for constructing the business application system shown in FIG. 1 and a framework for the business application system for use in the method.
Figure 12:
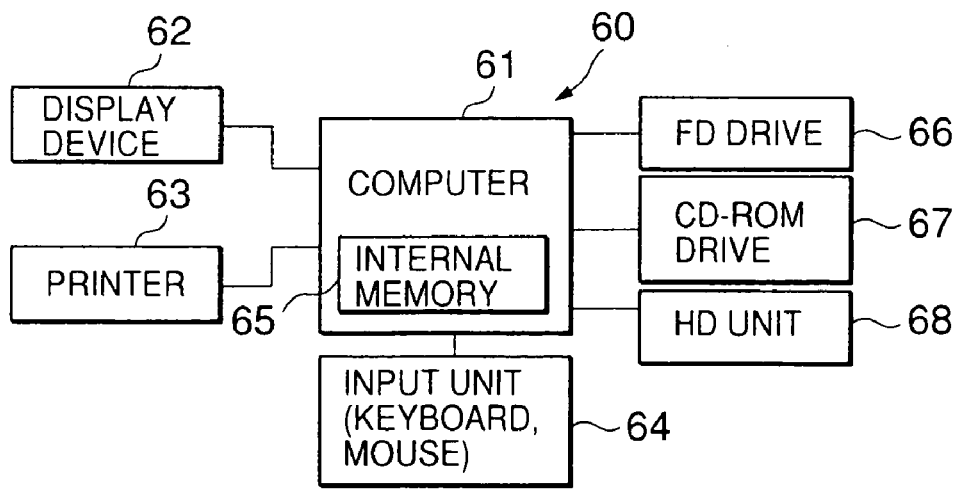
FIG. 12 is a block diagram of a hardware of the computer system shown in FIG. 11.

In addition, in the above described preferred embodiment, the framework for the business application system shown in FIG. 2 can be used for, e.g., a computer system 60 shown in FIGS. 11 and 12. FIG. 11 is a perspective view of the appearance of a computer system, and FIG. 12 is a block diagram of a hardware of the computer system shown in FIG. 11.

In FIGS. 11 and 12, the framework for the business application system shown in FIG. 2 is stored in a floppy disk 71 or a CD-ROM (Compact Disk-Read Only Memory) 72 serving as a storage medium. The framework for the business application system thus stored can be used to construct the business application system. Furthermore, the business application system thus constructed can be operated in the computer system 60.

The computer system 60 comprises: a computer body 61 housed in a case, such as a minitower type case; a display device 62, such as a cathode ray tube (CRT); a printer 63 serving as a record output device; a keyboard 64*a* and a mouse 64*b* which serve as input units; a floppy disk drive unit 66 for reading information out of the floppy disk 71 serving as a storage medium; and a CD-ROM drive unit 67 for reading information out of the CD-ROM 72 serving as a storage medium. In addition, an internal memory 65 comprising a random access memory (RAM) or the like, a hard disk unit (not shown), and so forth are provided in the computer body 61.

In such a computer system 60, the floppy disk 71 or the CD-ROM 72, which have stored the framework for the business application system, is inserted into a slot of the floppy disk drive unit 66 or the CD-ROM drive unit 67 as shown in FIG. 11, and the framework is installed in the computer body 61 in accordance with a predetermined procedure. Furthermore, the storage medium for storing the framework for the business application system should not be limited to the floppy disk 71 and the CD-ROM 72, but it may be a hard disk unit (not shown), a magneto optical (MO) disk, a digital versatile disk (DVD) or the like.

Furthermore, in the above described preferred embodiment, while the compile link technique has been adopted as a method for integrating the screen system functional group, the report system functional group and the business logic system functional group, which have been prepared at step 101, with the system core functional group prepared at step 102, a component selecting technique or a component plug-in technique may be used as another method for integrating the functional groups.

Figure 13:
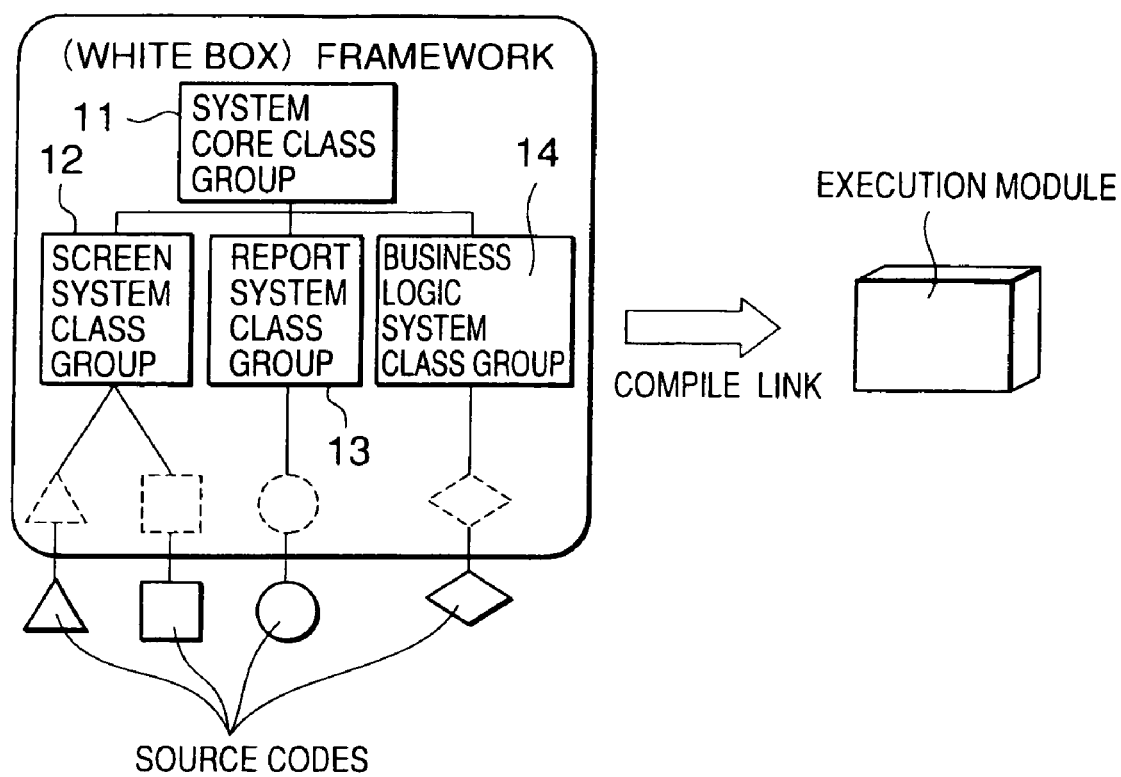
FIG. 13 is a schematic diagram showing the flow of processing when a business application system is constructed by utilizing a compile link technique.
Figure 14:
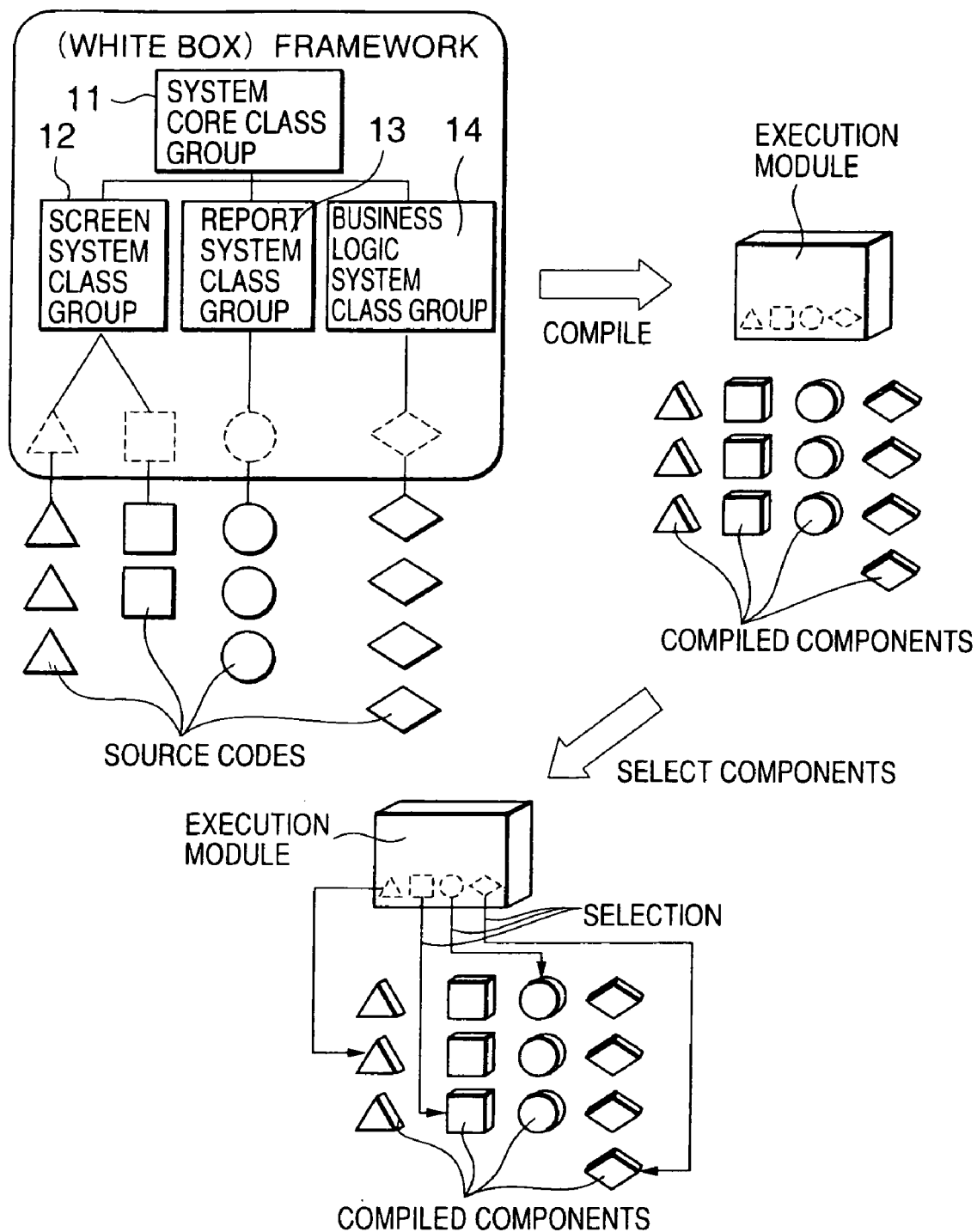
FIG. 14 is a schematic diagram showing the flow of processing when a business application system is constructed by utilizing a component selecting technique.
Figure 15:
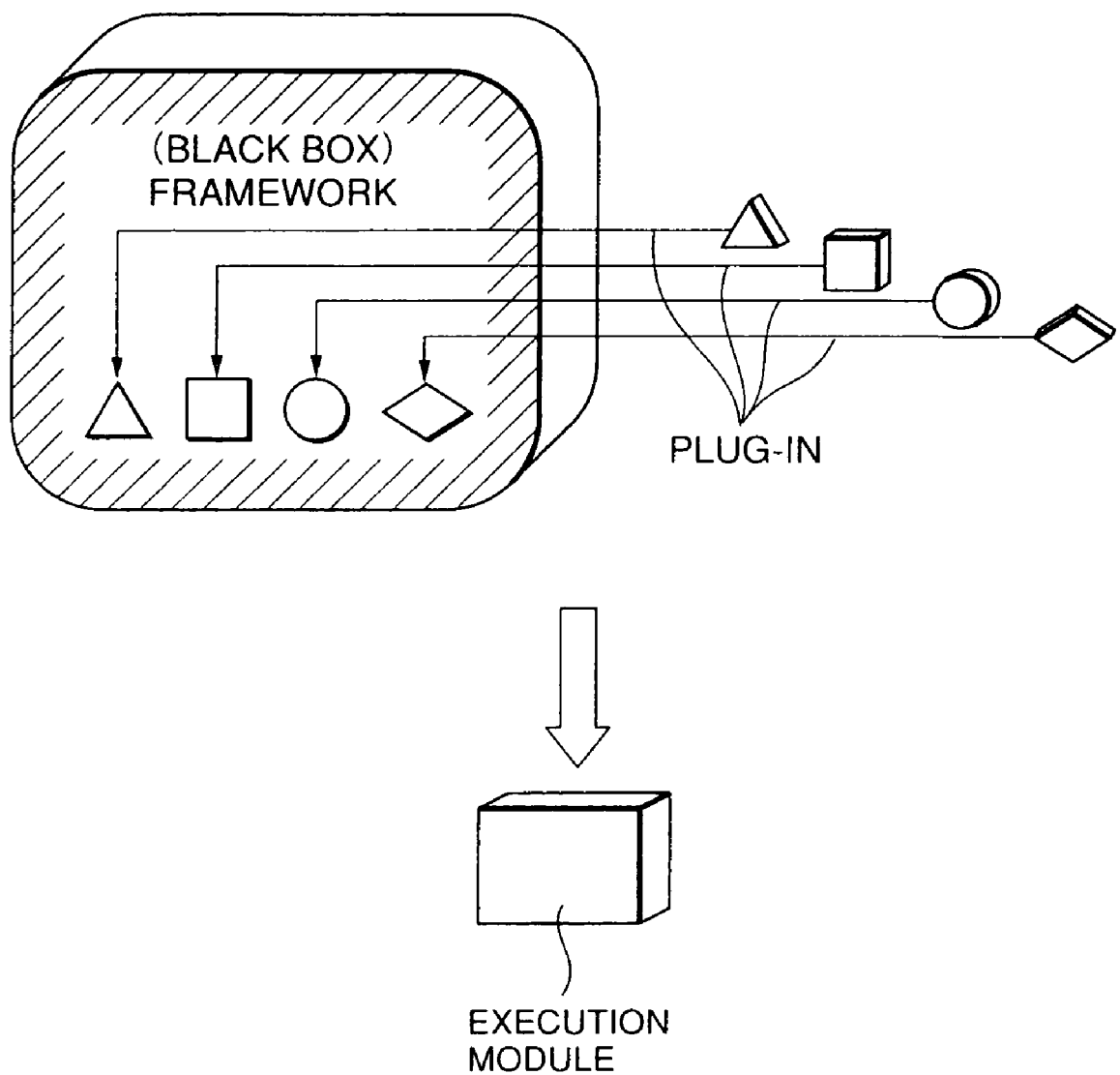
FIG. 15 is a schematic diagram showing the flow of processing when a business application system is constructed by utilizing a component plug-in technique.

Referring to FIGS. 13 through 15, the concept of the compile link technique, the component selecting technique and the component plug-in technique will be described below.

FIG. 13 is a schematic diagram showing the flow of processing when the business application system is constructed by utilizing the compile link technique. As shown in FIG. 13, this technique prepares the framework for the business application system as a so-called white box framework. The white box framework is a framework wherein the extension points for the abstract class and so forth are used as connection parts to open the internal packaging, and corresponds to the framework for the business application system in the above described preferred embodiment.

In this technique, the abstract class group (the screen system class group 12, the report system class group 13, the business logic system class group 14, etc.) included in the white box framework thus prepared is inherited, and the inherited abstract class group is directly overridden to be customized to produce a desired extended source code. Finally, the source code thus extended is compiled and linked to produce an execution module which can be executed in the computer system 60 shown in FIG. 12.

FIG. 14 is a schematic diagram showing the flow of processing when the business application system is constructed by utilizing the component selecting technique. As shown in FIG. 14, this technique prepares the framework for the business application system as a white box framework similar to the compile link technique shown in FIG. 13.

In this technique, the abstract class group (the screen system class group 12, the report system class group 13, the business logic system class group 14, etc.) included in the white box framework thus prepared is inherited, and the inherited abstract class group is directly overridden to be customized to produce a plurality of desired extended source codes.

Thereafter, the framework and the plurality of source codes thus prepared are divided and compiled, respectively, to produce an execution module having an extension point as a connection part, and a plurality of compiled components which are incorporated to be used in the execution module. The execution module can suitably select compiled components in execution time, and can assign one component every extension point. Therefore, an execution form, which can be executed in the computer system 60 shown in FIG. 12, can be obtained without the need of any compiles and links of the execution module and the respective components as a whole. Furthermore, in this technique, it is enough that if some components must be modified, only source codes corresponding to the components may be modified and compiled, and it is not required to compile and link the components as a whole unlike the compile link technique shown in FIG. 13.

FIG. 15 is a schematic diagram showing the flow of processing when the business application system is constructed by utilizing the component plug-in technique. As shown in FIG. 15, this technique prepares the framework for the business application system as a black box framework unlike the compile link technique shown in FIG. 13 and the component selecting technique shown in FIG. 14. The black box framework is a framework wherein the extension points for the abstract class and so forth are used as connection parts to close the internal packaging. Furthermore, the black box framework can be executed in the computer system 60 shown in FIG. 12, and the extension point thereof is provided as an interface inherent in the framework. The black frame work can be achieved using an existing component technique, such as Java (registered trademark), CORBA (Common Object Request Broker Architecture) and DCOM (Distributed Component Object Model). That is, according to this component technique, since the interface can be separated from the implementation, three parts, which are the framework body, the connection part of the framework body and the component incorporated in the framework body by means of the connection part, can be independently packaged. Since these three parts are independent of each other, even if the component incorporated in the framework body by means of the connection part is modified, such modification has no influence on the framework body and the overall system.

In this technique, after an object corresponding to the interface of the black box framework thus prepared is produced, the object is incorporated directly into the black box framework via the interface, so that it is possible to produce an execution module which can be executed in the computer system 60 shown in FIG. 12.

As an example of the method for constructing the business application system and the framework for the business application system which are shown in FIGS. 1 and 2, a business application system for in-home care shown in FIGS. 6 through 10 will be described below.

Figure 6:
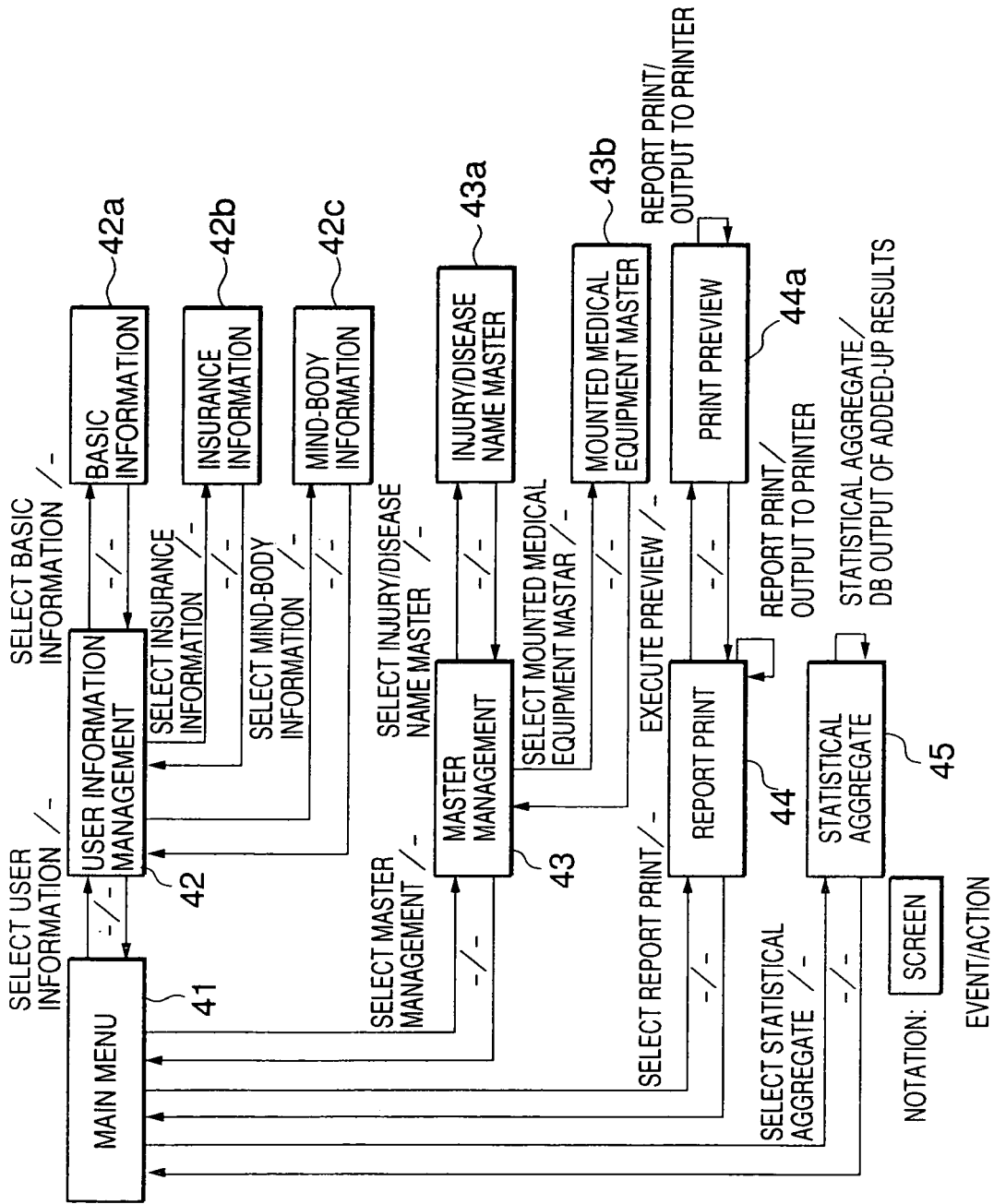
FIG. 6 is a schematic diagram showing a screen of a business application system as a premise of a preferred embodiment according to the present invention, and the expansion in processing thereof.

First, referring to FIGS. 6 through 10, a business application system serving as a premise of this preferred embodiment will be schematically described. FIG. 6 is a schematic diagram showing a screen of the business application system and the expansion of processing. FIGS. 7 through 10 are schematic diagrams showing the display on the screen of the business application system shown in FIG. 6. In FIG. 6, the boxes surrounded by rectangles show the state of the screen, and the arrows connecting the boxes surrounded by rectangles show the transition between the states. The notation "(A)/(B)" put on an arrow shows that a transition between states, which accompanies (action B), is caused by (event A). Furthermore, the notation "(A)/-" means that a transition between states, which accompanies no action, is caused by (event A), and the notation "-/-" means that a transition between states is caused by no event.

As shown in FIG. 6, the business application system comprises a user information management menu 42, a master management menu 43, a report print menu 44 and a statistical aggregate menu 45, which can be changed from a main menu 41, and can select an optional menu from the main menu 41.

When the user information management menu 42 is selected, the main menu 41 is changed to the user information management menu 42, which can be changed to any one of a basic information menu 42a, an insurance information menu 42b and a mind-body information menu 42c, which are submenus. Furthermore, the basic information menu 42a, the insurance information menu 42b and the mind-body information menu 42c, which are submenus, can be changed to any one of the user information management menu 42, the master management menu 43, the report print menu 44 and the statistical aggregate menu 45, which are upper menus, although this is not shown.

When the master management menu 43 is selected, the main menu 41 is changed to the master management menu 43, which can be changed to any one of an injury/disease name master menu 43a and a mounted medical equipment master menu 43b which are submenus. Furthermore, the injury/disease name master menu 43a and the mounted medical equipment master menu 43b, which are submenus, can be changed to any one of the user information management menu 42, the master management menu 43, the report print menu 44 and the statistical aggregate menu 45, which are upper menus, although this is not shown.

When the report print menu 44 is selected, the main menu 41 is changed to the report print menu 44 for inputting printing conditions. When printing conditions for printing a report are inputted to execute the report printing, the printer can output the report. When printing conditions for printing a report are inputted on the report print menu 44 to execute a report print preview, the report print menu 44 can be changed to a print preview screen 44a. Furthermore, in the print preview screen 44a, the printer can output a report having a print image while displaying the print image on the screen.

When the statistical aggregate menu 45 is selected, the main menu 41 is changed to the statistical aggregate menu 45 for inputting aggregate conditions. When aggregate conditions for statistical aggregate are inputted to execute a statistical aggregate, the added-up results can be registered in the database.

Figure 7:
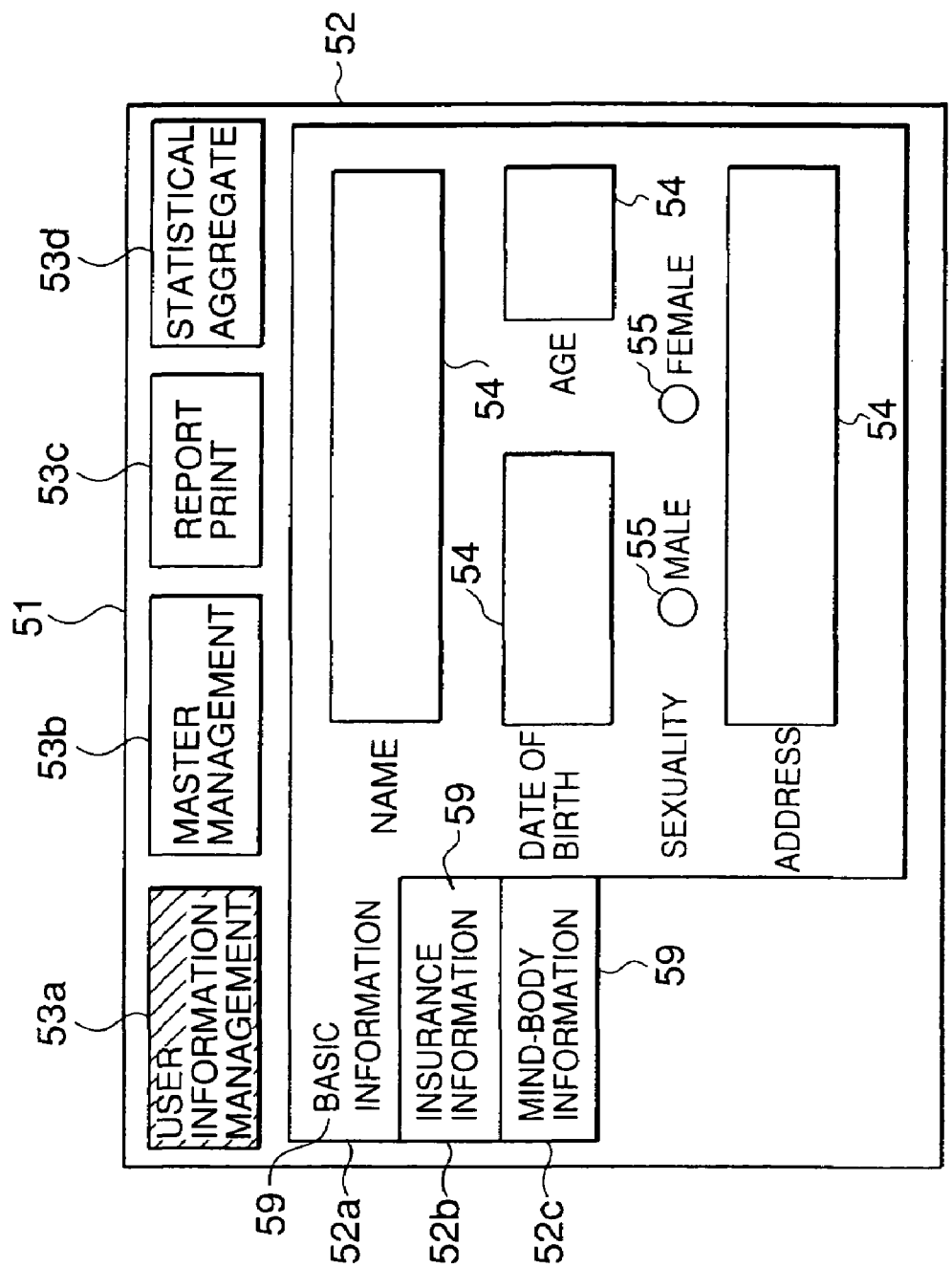
FIG. 7 is a schematic diagram of a start screen of the business application system shown in FIG. 6.
Figure 8:
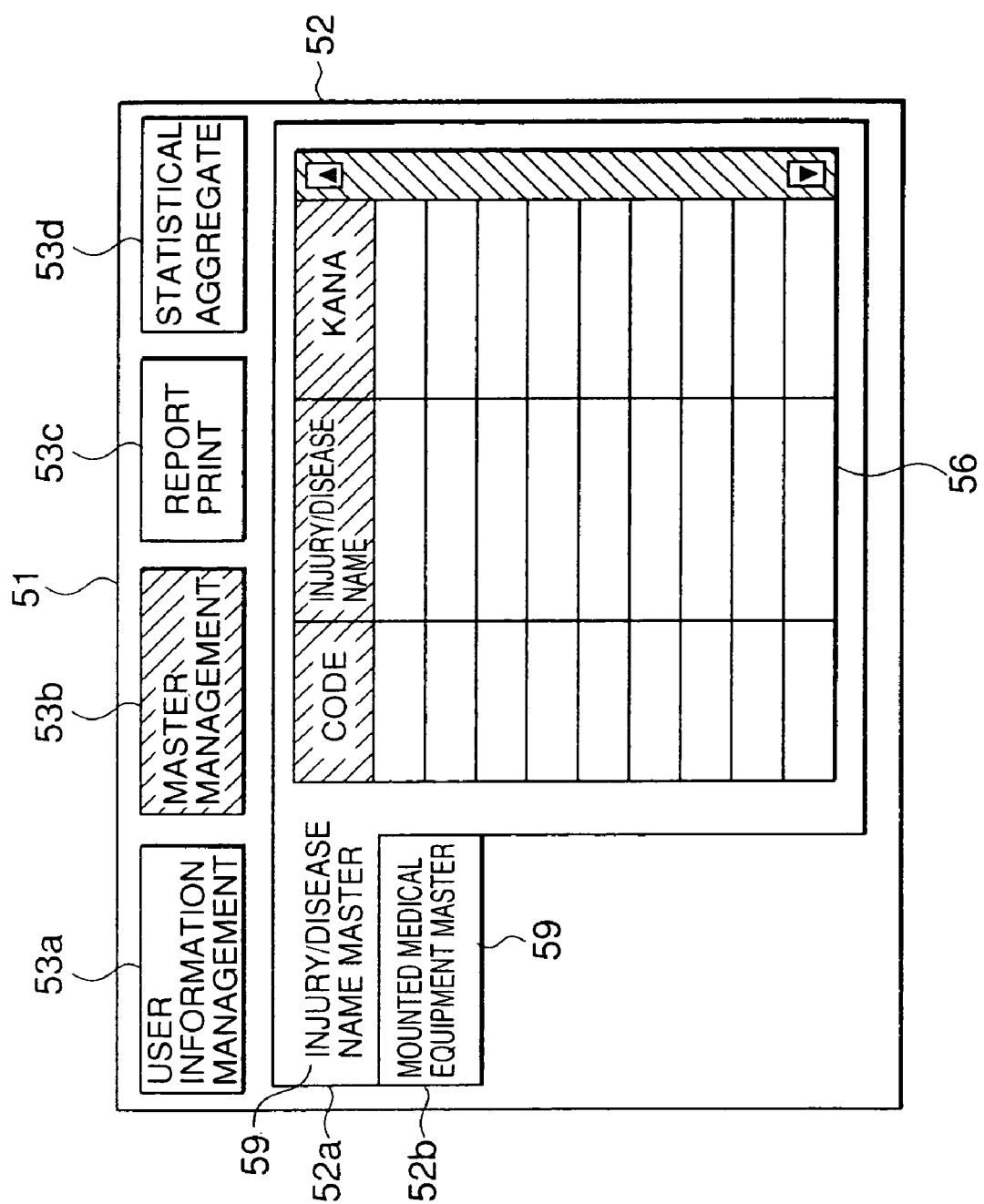
FIG. 8 is a schematic diagram of a screen when a master management menu is selected in the business application system shown in FIG. 6.
Figure 9:
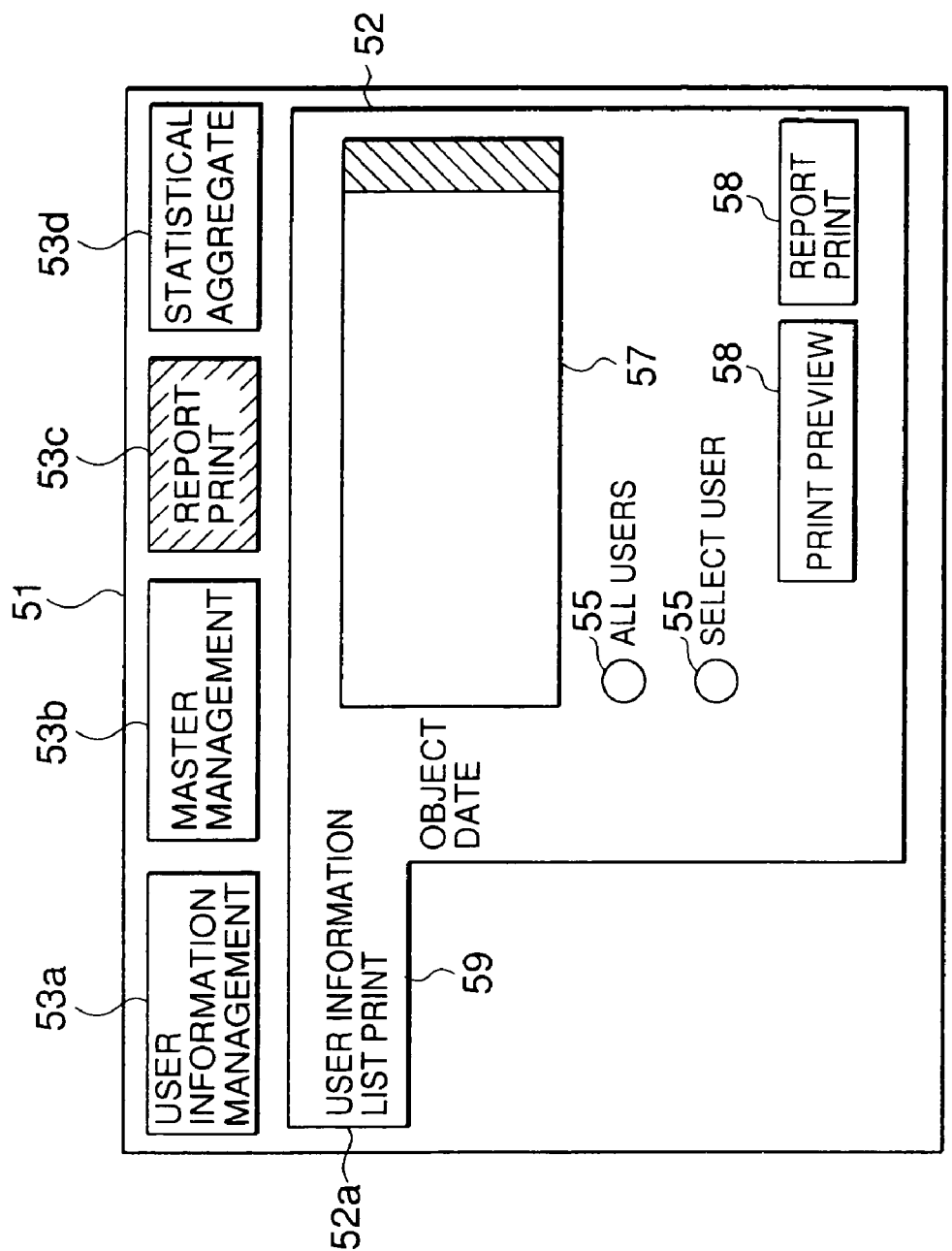
FIG. 9 is a schematic diagram of a screen when a report print menu is selected in the business application system shown in FIG. 6.
Figure 10:
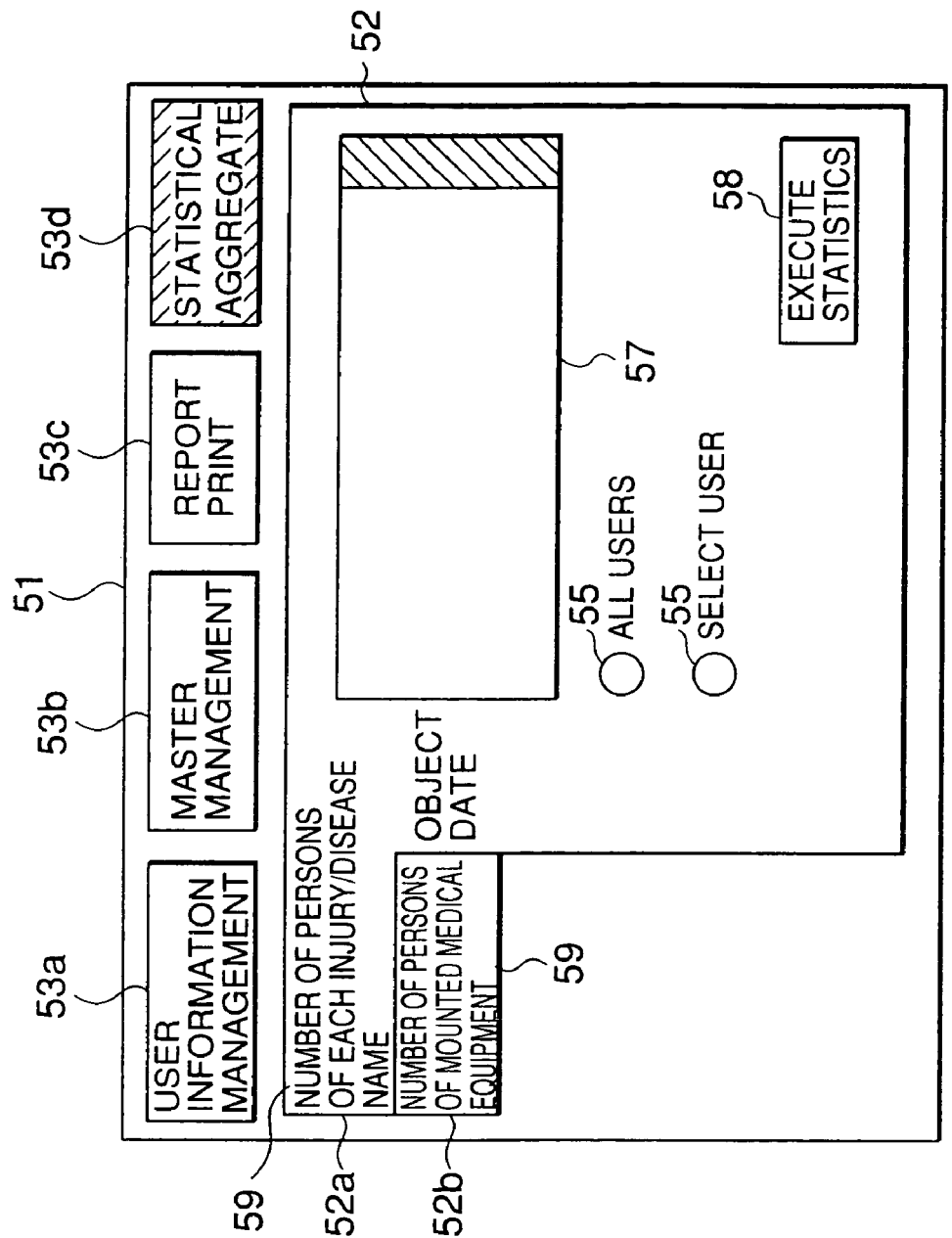
FIG. 10 is a schematic diagram of a screen when a statistical aggregate menu is selected in the business application system shown in FIG. 6.

FIGS. 7 through 10 show the display on the screen of the business application system shown in FIG. 6. FIG. 7 shows the screen when the user information management menu is selected, and FIG. 8 shows the screen when the master management menu is selected. FIG. 9 shows the screen when the report print menu is selected, and FIG. 10 shows the screen when the statistical aggregate menu is selected. Furthermore, when the business application system is started the screen shown in, e.g., FIG. 7, is displayed as an initial screen.

As shown in FIGS. 7 through 10, the screen of the business application system comprises a frame 51 and a submenu region 52. In the upper portion of the frame 51, menu buttons 53a, 53b, 53c and 53d are arranged. In the submenu region 52, a plurality of submenus 52a, 52b and 52c are displayed so as to be overlapped with each other. Furthermore, the tag parts 59 of the submenus 52a, 52b and 52c are displayed so as to be shifted from each other.

In each of the submenus 52a, 52b and 52c, GUI components, such as text boxes 54, radio buttons 55, a window 56, a dialog box 57 and a command box 58, are arranged. For example, an age calculated on the basis of the content of a text box 54 relating to "date of birth" is automatically displayed in a text box 54 relating to "age" shown in FIG.

7, out of the GUI components. The command button 58 for "statistics execution" shown in FIG. 10 serves as a start button for statistical logic. When the command button 58 is depressed (clicked), the statistical aggregate is carried out on the basis of aggregate conditions inputted in the submenu 52*a*.

In FIGS. 7 through 10, when any one of the menu buttons 53*a*, 53*b*, 53*c* and 53*d* arranged in the frame 51 is depressed (clicked), the corresponding one of the user information management menu screen shown in FIG. 7, the master management menu screen shown in FIG. 8, the report print menu screen shown in FIG. 9 and the statistical aggregate menu screen shown in FIG. 10 is displayed. When any one of the tag parts 59 of the submenus 52*a*, 52*b* and 52*c* displayed on the submenu region 52 is depressed (clicked), a target submenu moves forward to be displayed. Furthermore, since the menu buttons 53*a*, 53*b*, 53*c* and 53*d* are always arranged in the frame 51 on any one of screens shown in FIGS. 7 through 10, any one of the selected menus or submenus can be changed to another target menu by depressing (clicking) any one of the menu buttons 53*a*, 53*b*, 53*c* and 53*d*.

A preferred embodiment of a method for constructing a business application system and a framework for the business application system for use in the method shown in FIGS. 6 through 10 will be described below.

First, referring to FIGS. 2 through 4, a framework for a business application system for use in a method for constructing the business application system in this preferred embodiment will be described.

FIG. 3 is a schematic diagram of a preferred embodiment of an abstract class group of a framework for the business application system shown in FIG. 2. In each of boxes surrounded by rectangles showing abstract classes 11*a*, 12*a*, . . . , 14*a* in FIG. 3, the upper stage denotes a class name, the middle stage denotes an attribute, and the lower stage denotes a method.

As shown in FIG. 3, in an abstract class group 10 of the framework for the business application system in this preferred embodiment, a system core class group 11 includes a system core class 11*a*. The system core class 11*a* is an abstract class which has defined the basic attribute and behavior for executing the start and termination of processing, the manipulation of data, the transmission and receiving of a request, the selection of a menu, the execution of various functions, the calling of common components, and so forth in accordance with a mode representing the execution state of the business application system.

The screen system class group 12 inherits the attribute and method of the system core class 11*a* of the system core class group 11, and includes a screen basic class 12*a*, an input/output screen class 12*b*, a list screen class 12*c* and a list history screen class 12*d*. The screen basic class 12*a* is an abstract class which has defined the relationship between the frame 51 and the submenus 52*a*, 52*b* and 52*c* shown in FIGS. 7 through 10, and the basic attribute and behavior of a screen relating to the transition between screens and so forth. The input/output screen class 12*b* is an abstract class which has defined the basic attribute and behavior of a screen relating to the input/output of data and so forth in the submenus 52*a*, 52*b* and 52*c* shown in FIG. 7. The list screen class 12*c* is an abstract class which has defined the basic attribute and behavior of a screen relating to a list type display and so forth in the submenus 52*a* and 52*b* shown in FIG. 8. The list history screen class 12*d* is an abstract class which has defined the basic attribute and behavior of a screen relating to a list type display and so forth and which also manages the history, such as change and modification in the submenus 52*a* and 52*b* shown in FIG. 8.

Furthermore, the input/output screen class 12*b* and the list screen class 12*c* inherit the attribute and method of the screen basic class 12*a*, and the list history screen class 12*d* inherits the attribute and method of the list screen class 12*c*. On the basis of such an inheritance relationship, a hierarchical structure is formed between the screen basic class 12*a*, the input/output screen class 12*b*, the list screen class 12*c* and the list history screen class 12*d*. For example, as the hierarchy moves downwards from the screen basic class 12*a* to the list history screen class 12*d* via the list screen class 12*c*, the method is more implemented. That is, the method relating to the general display defined in the screen basic class 12*a* is the method relating to the list type display in the list screen class 12*c*, and the method relating to the list type display which also manages the history, such as change and modification, in the list history screen class 12*d*.

The report system class group 13 inherits the attribute and method of the system core class 11*a* of the system core class group 11, and includes a list report class 13*a*. The list report class 13*a* is an abstract class which has defined the basic attribute and behavior for executing the print of a list type report based on the conditions (object date, object data, etc.) for printing the report, the selection of conditions, the read of data, the print preview and so forth.

The business logic system class 14 inherits the attribute and method of the system core class 11*a* of the system core class group 11, and includes a statistical processing class 14*a*. The statistical processing class 14*a* is an abstract class which has defined the basic attribute and behavior for executing the aggregate calculation based on the conditions (object date, object data, etc.) for the statistical aggregate, the read of data, classification, counting every classification, the writing of the total into the database, and so forth.

Figure 4:
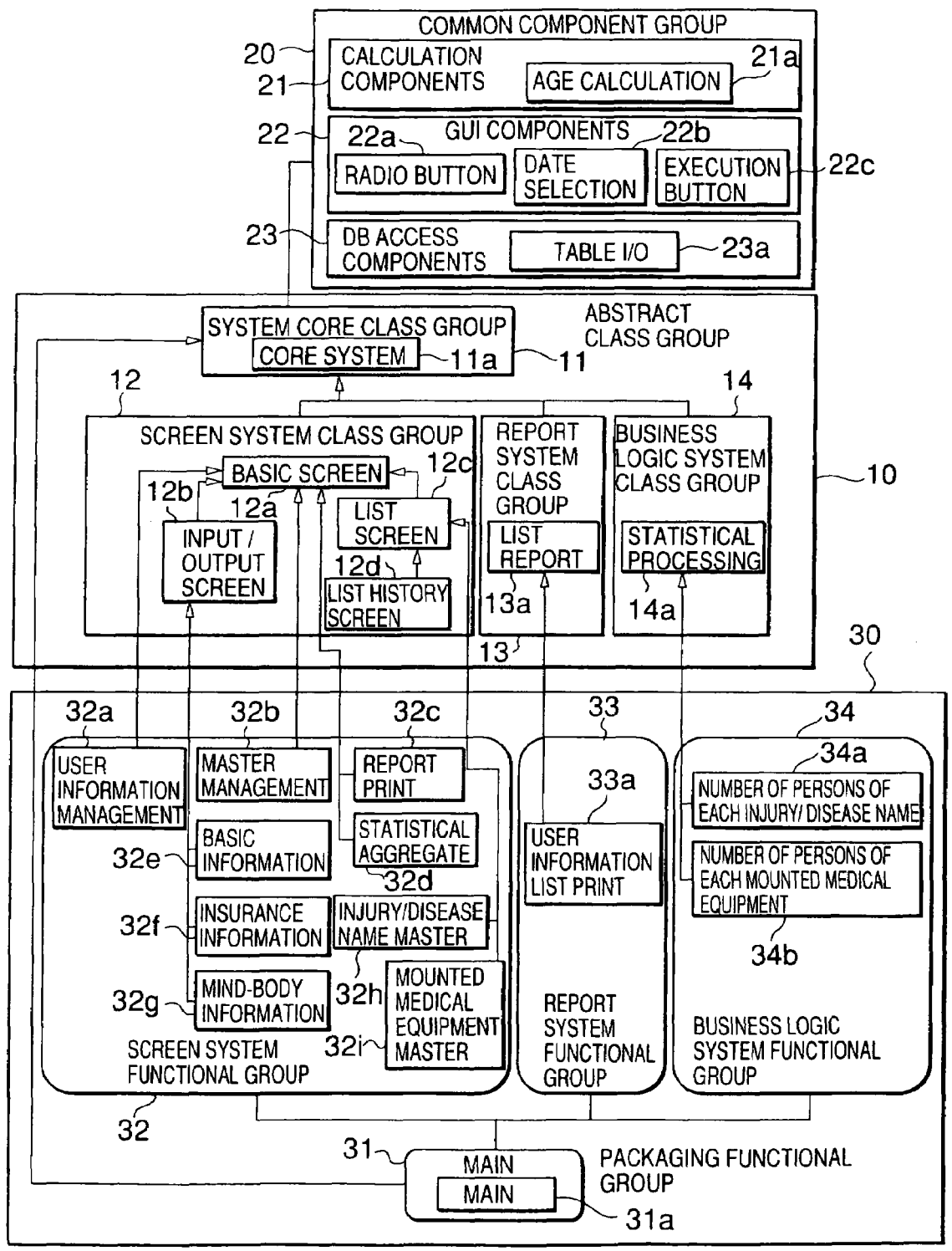
FIG. 4 is a schematic diagram of a preferred embodiment of the abstract class group and a common component group of the framework for the business application system shown in FIG. 2, and a packaged functional group inheriting the abstract class group to be packaged.

FIG. 4 is a schematic diagram showing the abstract class group and the common component group of the framework for the business application system shown in FIGS. 2 and 3, and a packaging functional group which inherits the abstract class group to be packaged. Herein, only the constructions of the abstract class group 10 and the common component group 20 will be described. The packaging functional group 30, which inherits the abstract class group to be packaged, will be described when a method for constructing the business application system will be described.

In FIG. 4, the abstract class group 10 corresponds to the abstract class group 10 corresponding to the abstract class group 10 shown in FIG. 3. Only class names of the abstract classes 11*a*, 12*a*, . . . , 14*a* are shown herein for simplification.

The common component group 20 is a set of common components called from the system core class group 11 of the abstract class group 10. The common component group 20 includes: an age calculation component 21*a* as one of processing components 21; a radio button 22*a*, a date selecting dialog 22*b*, an execution button 22*c* and so forth as GUI components 22; and a table I/O processing component 23*a* for accessing a table or file of the database system as one of DB access components 23. Furthermore, the common component group 20 may also include a print system component, a communication processing component and so forth as common components, which are not shown.

Referring to FIGS. 1 through 4, a method for constructing the business application system shown in FIGS. 6 through 10 by using such a framework for the business application system will be described below.

First, the screen system class group 12, the report system class group 13 and the business logic system class group 14 of the abstract class group 10 in the framework for the business application system shown in FIGS. 2 through 4 are inherited to prepare a screen system functional group 32, a report system functional group 33 and a business logic system functional group 34 (step 101).

Specifically, an optional abstract class is inherited from the screen class group 12 (step 101a-1), and the method of the inherited abstract class is implemented or an attribute and a method are added thereto, so that the abstract class is customized (step 101a-2) to prepare a screen system functional group 32 which is a program in which a screen system function is packaged.

As shown in FIG. 4, when the business application system shown in FIGS. 6 through 10 is constructed, a user information management function 32a, a master management function 32b, a report print function 32c and a statistical aggregate function 32d, which are screen system functions, are prepared by the inheritance of the screen basic class 12a, the implementation of the method thereof and so forth. In addition, a basic information function 32e, an insurance information function 32f and a mind-body information function 32g, which are screen system functions, are prepared by the inheritance of the input/output screen class 12, the implementation of the method thereof and so forth. Moreover, an injury/disease name master function 32h and a mounted medical equipment master function 32i, which are screen system functions, are prepared by the inheritance of the list screen class 12c, the implementation of the method thereof and so forth. Furthermore, the user information management function 32a, the master management function 32b, the report print function 32c and the statistical aggregate function 32d are programs for associating the frame 51 with the submenu regions 52 shown in FIGS. 7 through 10 and for carrying out the display control, such as the transition between screens. The basic information function 32e, the insurance information function 32f and the mind-body information function 32g are programs for carrying out the display control of the basic information menu 52e, the insurance information menu 52b and the mind-body information menu 52c in the submenu regions 52 shown in FIG. 7 and for carrying out the display control of the text boxes 54 and the radio buttons 55 necessary for the input/output of basic information, insurance information and mind-body information. The injury/disease name master function 32h and the mounted medical equipment master function 32i are programs for carrying out the display control of the injury/disease name master menu 52a and the mounted medical equipment master menu 52b in the submenu regions 52 shown in FIG. 8 and for carrying out the display control of the window 56 necessary for list management.

In addition, an optical subtract class is inherited from the report system class group 13 (step 101b-1), and the method of the inherited abstract class is implemented or an attribute and a method are added thereto, so that the abstract class is customized (step 101b-2) to prepare a report system functional group 33 which is a program, in which a report system function is packaged.

As shown in FIG. 4, when the business application system shown in FIGS. 6 through 10 is constructed, a user information list print function 33a, which is a report system function, is prepared by the inheritance of the list report class 13a, the implementation of the method thereof and so forth. Furthermore, the user information list print function 33a is a program for executing a list type report print for user information, and the print preview thereof.

Moreover, an optional abstract class is inherited from the business logic system class group 14 (step 101c-1). Then, the method of the inherited abstract class is implemented or an attribute and a method are added thereto, so that the abstract class is customized (step 101c-2) to prepare a business logic system functional group 34 serving as a program wherein a business logic system function is packaged.

As shown in FIG. 4, when the business application system shown in FIGS. 6 through 10 is constructed, a function 34a for the number of persons of each injury/disease name and a function 34b for the number of persons of each mounted medical equipment, which are business logic system functions, are prepared by the inheritance of the statistical processing class 14a, the implementation of the method and so forth. The function 34a for the number of persons of each injury/disease name and the function 34b for the number of persons of each injury/disease name are programs for adding up the number of persons corresponding to each user's injury/disease name and the number of persons corresponding to each user's mounted medical equipment for statistical object date and users, respectively.

Then, after the screen system functional group 32, the report system functional group 33 and the business logic system functional group 34 are thus prepared, the system core class group 11 of the abstract class group 10 is inherited to prepare a main functional group 31 (step 102).

Specifically, an optional abstract class is inherited from the system core class group 11 (step 102-1). Then, the method of the inherited abstract class is implemented, or an attribute and a method are added thereto, so that the abstract class is customized (step 102-2) to prepare the main functional group 31 serving as a program wherein a main function is packaged. When the business application system shown in FIGS. 6 through 10 is constructed, the main function 31a is prepared by the inheritance of the system core class 11a, the implementation of the method and so forth, as shown in FIG. 4. Furthermore, the main function 31a is a program for providing the start and termination of processing, the manipulation of data, the transmission and receiving of a request, the selection of a menu, the transition of processing, the control of the screen system functional group 32, the report system functional group 33 and the business logic system functional group 34, the input/output of data, the interface (the calling of a component) to the common component group 20, and so forth.

Finally, after the main functional group 31 is thus prepared, the screen system functional group 32, the report system functional group 33 and the business logic system functional group 34, which have been prepared at step 101, are compiled and linked with the system core functional group 31 prepared at step 102 (step 103). Thus, the business application system is constructed.

Figure 5:
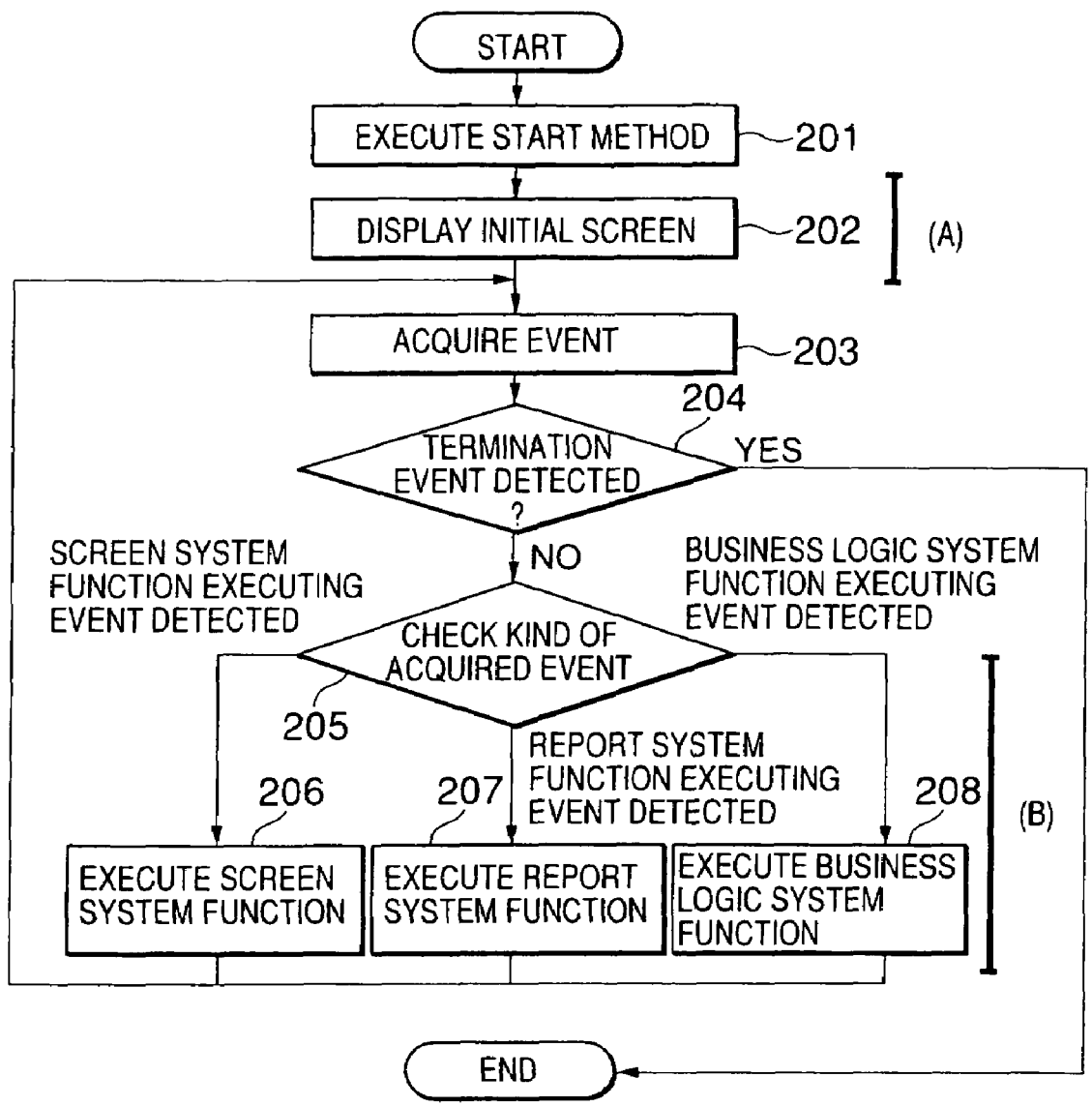
FIG. 5 is a flow chart for explaining the operation of the business application system constructed by using the framework for the business application system shown in FIGS. 3 and 4.

FIG. 5 is a flow chart for explaining the operation of the business application system thus constructed.

In such a business application system, the start method of the main function 31a of the system core functional group 31, which has inherited to the system core class 11a of the system core class group 11 to be implemented, is executed (step 201), so that the screen shown in FIG. 7 is displayed as an initial screen (step 202). Furthermore, the processing of step 202 (part (A)) shows the content to be processed at the start time of the business application system, and the content of processing can be changed every business application system by suitably customizing the start method of the system core class 11a.

After the initial screen is thus displayed, the input from an input unit, such as a mouse or a keyboard, (the movement of a cursor and click based on a mouse, data input from a keyboard, etc.), is acquired as an event (step 203). When the event thus acquired is a termination event which means the termination of the application, the business application system is completed (step 204).

On the other hand, when the acquired event is not the termination event (step 204), the kind of the acquired event is checked (step 205). Then, the screen system functional group 32, the report system functional group 33 and the business logic system functional group 34 are executed in accordance with the kind of the acquired event. That is, when the acquired event means the execution of the screen system functional group 32, the method corresponding to the screen system functional group 32 is executed (step 206). When the acquired event means the execution of the report system functional group 33, the method corresponding to the report system functional group 33 is executed (step 207). When the acquired event means the execution of the business logic system functional group 34, the method corresponding to the business logic system functional group 34 is executed (step 208). Furthermore, when the acquired event means none of the executions of the screen system functional group 32, the report system functional group 33 and the business logic system functional group 34, the routine returns to step 203 to acquire an event again. Furthermore, in the case of the business application system shown in FIGS. 7 through 10, the depression (click) of the menu button 53a, 53b, 53c or 53d of the frame 51 is acquired as an event to cause the transition to a target menu, and the depression (click) of the tag part 59 of the submenu 52a, 52b or 52c is acquired as an event to cause the transition to a target submenu.

Furthermore, the processing of steps 205 through 208 (part (B)) shows functions to be executed and the execution conditions of the functions. The executed contents can be changed every business application system by suitably customizing the menu selection method, the function execution method and so forth of the system core class 11a.

As described above, according to the present invention, it is possible to flexibly and easily change and extend a business application system in accordance with a specification change, and it is possible to commonly use and reuse the basic structure of the overall business application system.

In addition, according to the present invention, even if a business application system is developed by different developers every functional group, it is not required develop the business application system while each of the developers cooperates with other developers, so that each of the developers can develop only the functional group to be developed.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

The invention claimed is:

1. A method for constructing a business application system by using a framework described by an object-oriented language, the method comprising the steps of:

preparing an abstract class group including (i) a system core class group, which has abstractly defined a basic structure and behavior of a business application system that includes a screen system function for inputting data through a screen, a report system function for printing a report on the basis of the data inputted by the screen system function, a business logic system function for executing at least calculation or aggregation on the basis of the data inputted by the screen system function, and (ii) a screen system class group, a report system class group and a business logic system class group, which respectively inherit said system core class group, wherein said three system class groups are related to each other through said system core class group so that said report system class group and said business logic system class group can start and terminate their processing on the basis of the data inputted through the screen provided by the screen system class group;

inheriting said screen system class group, said report system class group and said business logic system class group of said abstract class group to prepare a screen system functional group, a report system functional group and a business logic system functional group;

inheriting said system core class group of said abstract class group to prepare a system core functional group; and integrating said screen system functional group, said report system functional group, said business logic system functional group and said system core functional group.

2. The method for constructing a business application system as set forth in claim 1, further comprising the step of preparing a common component group including plurality of common components commonly for use in said business application system, each of said common components having an interface with said abstract class group.

3. The method for constructing a business application system as forth in claim 1, wherein each of said system core class group, said screen system class group, said report system class group and said business logic system class group includes a plurality of abstract classes having a hierarchical structure based on at least one inheritance relationship.

4. The method for constructing a business application system as set forth in claim 1, wherein each of abstract classes included in each of said system core class group, said screen system class group, said report system class group and said business logic system class group includes an abstract method and a concrete method.

5. The method for constructing a business application system as set forth I claim 1, wherein said integrating step compiles and links said screen system functional group, said report system function group, said business logic system functional group and said system core functional group.

6. The method for constructing a business application system as set forth in claim 1, wherein said integrating step incorporates and screen system functional group, said report system functional group, said business logic system functional group and said system core functional group by means of a previously prepared inherent interface.

7. A computer-readable storage medium having stored a framework for a business application system, which has been described by an object-oriented language, said framework including:

an abstract class group which has abstractly defined a structure and behavior of a business application system that includes a screen system function for inputting data through a screen, a report system function for printing a report on the basis of the data inputted by the screen system function, a business logic system function for executing at least calculation or aggregation on the basis of the data inputted by the screen system function, said abstract class group including (i) a system core class group, which has abstractly defined a basic structure and behavior of said business application system, and (ii) a screen system class group, a report system class group and a business logic system class group, which respectively inherit said system core class group, wherein said three system class groups are related to each other through said system core class group so that said report system class group and said business logic system class group can start and terminate their processing on the basis of the data inputted through the screen provided by the screen system class group.

8. The computer-readable storage medium having stored a framework for a business application system as set forth in claim 7, further including a common component group including a plurality of common components commonly for use in said business application system, each of said common components having an interface with said abstract class group.

9. The computer-readable storage medium having stored a framework for a business application system as set forth in claim 7, wherein each of said system core class group, said screen class group, said report system class group and said business logic system class group of said abstract class group includes a plurality of abstract classes having hierarchical structure based on at least one inheritance relationship.

10. The computer-readable storage medium having stored a framework for a business application system as set forth in claim 7, wherein each of abstract classes included in each of said system core class group, said screen system class group, said report system class group and said business logic system class group of said abstract class group includes an abstract method and a concrete method.

11. A computer-readable storage medium having stored a framework for a business application system, which includes a plurality of class groups which are described by an object-oriented language said framework including:

a system core class group having defined manipulation of data in a business application system that includes a screen system function for inputting data through a screen, a report system function for printing a report on the basis of the data inputted by the screen system function, a business logic system function for executing at least calculation or aggregation on the basis of the data inputted by the screen system function; and a screen system class group, a report system class group and a business logic system class group inheriting said system class group;

wherein said screen system class group, said report system class group and said business logic system class group are related to each other through said system core class group so that said report system class group and said business logic system class group can start and terminate their processing on the basis of the data inputted through the screen provided by the screen system class group.

12. The computer-readable storage medium as set forth in claim 11, wherein said system core class group has defined the calling of a common component commonly for use in said business application system.

13. A computer-readable storage medium having stored a framework for a business application system, which includes a plurality of class groups which are described by an object-oriented language said framework including:

a system core class group having defined transmission and receiving of a request between functions in a business application system that includes a screen system function for inputting data through a screen, a report system function for printing a report on the basis of the data inputted by the screen system function, a business logic system function for executing at least calculation or aggregation on the basis of the data inputted by the screen system function; and a screen system class group, a report system class group and a business logic class group inheriting said system class group;

wherein said screen system class group, said report system class group and said business logic system class group are related to each other through said system core class group so that said report system class group and said business logic system class group can start and terminate their processing on the basis of the data inputted through the screen provided by the screen system class group.

14. The computer-readable storage medium as set forth in claim 13, wherein said system core class group has defined the calling of a common component commonly for use in said business application system.

* * * * *